US012308887B2

(12) United States Patent
Paloczi et al.

(10) Patent No.: US 12,308,887 B2
(45) Date of Patent: May 20, 2025

(54) INTEGRATED PHOTONIC INTEGRATED CIRCUIT (PIC) AND READOUT INTEGRATED CIRCUIT (ROIC) FOR HIGH-SPEED DATA OUTPUT FROM FOCAL PLANE ARRAY

(71) Applicant: Raytheon Company, Waltham, MA (US)

(72) Inventors: George T. Paloczi, Goleta, CA (US); Justin G. A. Wehner, Goleta, CA (US); Shelly J. Mechery, Porter Ranch, CA (US)

(73) Assignee: Raytheon Company, Arlington, VA (US)

( * ) Notice: Subject to any disclaimer, the term of this patent is extended or adjusted under 35 U.S.C. 154(b) by 73 days.

(21) Appl. No.: 18/055,766

(22) Filed: Nov. 15, 2022

(65) Prior Publication Data

US 2024/0162989 A1 May 16, 2024

(51) Int. Cl.
*H04B 10/40* (2013.01)
*H04B 10/07* (2013.01)
*H04B 10/69* (2013.01)
*H04B 10/80* (2013.01)
*H04N 25/75* (2023.01)

(52) U.S. Cl.
CPC ............. *H04B 10/40* (2013.01); *H04B 10/07* (2013.01); *H04B 10/691* (2013.01); *H04B 10/801* (2013.01); *H04N 25/75* (2023.01)

(58) Field of Classification Search
None
See application file for complete search history.

(56) References Cited

U.S. PATENT DOCUMENTS

| 3,975,628 | A | | 8/1976 | Graves et al. |
| 4,956,686 | A | * | 9/1990 | Borrello ............ H01L 27/14649 |
| | | | | 250/370.06 |

(Continued)

FOREIGN PATENT DOCUMENTS

EP 3761528 A1 1/2021

OTHER PUBLICATIONS

ISR and WO of the ISA dated Aug. 7, 2024 for PCT/US2023/025670, 12 pages (Year: 2024).*

(Continued)

*Primary Examiner* — Darren E Wolf

(57) ABSTRACT

An apparatus includes a focal plane array configured to receive incoming light. The apparatus also includes a readout integrated circuit configured to generate electrical signals based on the incoming light received by the focal plane array. The apparatus further includes a photonic integrated circuit positioned between the focal plane array and the readout integrated circuit. The photonic integrated circuit is configured to receive the electrical signals and generate output optical signals based on the electrical signals. In some cases, the apparatus may include electrically-conductive vias electrically coupling the focal plane array and the readout integrated circuit, where at least some of the electrically-conductive vias may extend through the photonic integrated circuit. The focal plane array, the readout integrated circuit, and the photonic integrated circuit may form at least part of a monolithic structure.

20 Claims, 4 Drawing Sheets

(56) References Cited

U.S. PATENT DOCUMENTS

| | | | |
|---|---|---|---|
| 6,449,047 B1* | 9/2002 | Bao | G01D 5/35383 356/478 |
| 7,408,507 B1 | 8/2008 | Paek et al. | |
| 7,680,368 B2 | 3/2010 | Welch et al. | |
| 7,729,572 B1 | 6/2010 | Pepper et al. | |
| 7,949,030 B2 | 5/2011 | Volodin | |
| 8,068,235 B1 | 11/2011 | Marron et al. | |
| 8,355,605 B1* | 1/2013 | Wach | H04B 10/506 385/32 |
| 8,546,929 B2* | 10/2013 | Ong | H01L 24/19 257/E23.125 |
| 9,709,668 B1 | 7/2017 | Kondratko et al. | |
| 10,037,982 B2 | 7/2018 | Evans et al. | |
| 10,284,824 B2* | 5/2019 | Cai | G02B 6/12002 |
| 10,620,375 B2 | 4/2020 | Ehrlichman et al. | |
| 10,790,909 B1 | 9/2020 | Suni | |
| 10,838,222 B2 | 11/2020 | Khachaturian et al. | |
| 11,029,465 B1 | 6/2021 | Rakowski et al. | |
| 11,067,754 B2 | 7/2021 | Kimerling et al. | |
| 11,333,557 B2 | 5/2022 | Uyeno et al. | |
| 11,476,576 B2 | 10/2022 | Palese et al. | |
| 11,532,881 B2 | 12/2022 | Kendrick et al. | |
| 2001/0030789 A1* | 10/2001 | Jiang | G02B 6/428 398/139 |
| 2002/0114044 A1* | 8/2002 | Chiou | H04B 10/1125 398/121 |
| 2005/0036789 A1* | 2/2005 | Bjorndahl | H04B 10/801 398/118 |
| 2006/0239312 A1 | 10/2006 | Kewitsch et al. | |
| 2009/0169149 A1 | 7/2009 | Block | |
| 2015/0050028 A1* | 2/2015 | Budd | G02B 6/4243 29/846 |
| 2015/0163401 A1* | 6/2015 | Botts | H04N 25/40 348/231.99 |
| 2015/0293224 A1 | 10/2015 | Eldada et al. | |
| 2015/0378241 A1 | 12/2015 | Eldada | |
| 2016/0057369 A1* | 2/2016 | Wolfe | H04N 5/33 348/322 |
| 2016/0094016 A1 | 3/2016 | Beach et al. | |
| 2017/0170556 A1 | 6/2017 | Carey et al. | |
| 2017/0234984 A1 | 8/2017 | Khial et al. | |
| 2017/0324162 A1 | 11/2017 | Khachaturian et al. | |
| 2018/0039154 A1 | 2/2018 | Hashemi et al. | |
| 2018/0107091 A1 | 4/2018 | Hosseini et al. | |
| 2019/0067500 A1 | 2/2019 | Di Papa | |
| 2019/0260123 A1 | 8/2019 | Poulton et al. | |
| 2019/0260124 A1 | 8/2019 | Davoyan et al. | |
| 2019/0391348 A1 | 12/2019 | Osenbach et al. | |
| 2020/0192179 A1 | 6/2020 | Hajimiri | |
| 2020/0284910 A1 | 9/2020 | Yaacobi et al. | |
| 2021/0014965 A1 | 1/2021 | Fang et al. | |
| 2021/0067251 A1 | 3/2021 | Park et al. | |
| 2021/0141058 A1* | 5/2021 | Piggott | G01S 7/4817 |
| 2021/0149227 A1 | 5/2021 | Lee et al. | |
| 2021/0257396 A1* | 8/2021 | Piggott | G01S 7/4815 |
| 2021/0364695 A1 | 11/2021 | Shin et al. | |
| 2022/0019019 A1 | 1/2022 | Kendrick et al. | |
| 2022/0244578 A1 | 8/2022 | Palese et al. | |
| 2022/0252908 A1 | 8/2022 | Inamdar et al. | |
| 2023/0097800 A1* | 3/2023 | Fryman | H04B 10/801 398/182 |

OTHER PUBLICATIONS

Estrella, "Progress in Optical Interconnects for Harsh Environments", Proceedings of the SPIE, vol. 11995, Mar. 2022, 8 pages ( Year: 2022).*

Rhim et al., "Verilog—A behavioral model for resonance-modulated silicon micro-ring modulator," Optics Express, vol. 23, No. 7, Apr. 2015, 11 pages.

Creedon et al., "High efficiency coherent beam combining of semiconductor optical amplifiers," Optics Letters, vol. 37, No. 23, Dec. 2012, 3 pages.

Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.

Heidel et al., "A Review of Electronic-Photonic Heterogeneous Integration at DARPA," IEEE Journal of Selected Topics in Quantum Electronics, vol. 22, No. 6, Nov. 2016, 9 pages.

Kim et al., "A Single-Chip Optical Phased Array in a Wafer-Scale Silicon Photonics / CMOS 3D-Integration Platform," IEEE Journal of Solid-State Circuits, vol. 54, Issue 11, Nov. 2019, 14 pages.

Komljenovic et al., "On-chip calibration and control of optical phased arrays," Optics Express, vol. 26, No. 3, Jan. 2018, 12 pages.

Larocque et al., "Beam steering with ultracompact and low-power silicon resonator phase shifters," Optics Express, vol. 27, No. 24, Nov. 2019, 16 pages.

Li et al., "Fast Optical Phased Array Calibration Technique for Random Phase Modulation LiDAR," IEEE Photonics Journal, vol. 11, No. 1, Feb. 2019, 10 pages.

Marron et al., "Atmospheric turbulence correction using digital holographic detection: experimental results," Optics Express, vol. 17, No. 14, Jul. 2009, 14 pages.

Marron et al., "Extended-range digital holographic imaging," Proc. of SPIE, vol. 7684 76841J, 2010, 6 pages.

Mehta et al., "An Optically Sampled ADC in 3D Integrated Silicon-Photonics/65nm CMOS," IEEE 2020 Symposium on VLSI Technology Digest of Technical Papers—THL.3, 2020, 2 pages.

Orcutt et al., "Open foundry platform for high-performance electronic-photonic integration," Optics Express, vol. 20, No. 11, May 2012, 11 pages.

Sayyah et al., "Two-dimensional pseudo-random optical phased array based on tandem optical injection locking of vertical cavity surface emitting lasers," Optics Express, vol. 23, No. 15, Jul. 2015, 12 pages.

Zhang et al., "Phase Calibration of On-Chip Optical Phased Arrays via Interference Technique," IEEE Photonics Journal, vol. 12, No. 2, Apr. 2020, 11 pages.

Abediasl et al., "Monolithic optical phased-array transceiver in a standard SOI CMOS process", Optics Express, vol. 23, No. 5, Mar. 2015, 11 pages.

Office Action dated Sep. 16, 2021 in connection with U.S. Appl. No. 17/174,132, 18 pages.

International Search Report and Written Opinion of the International Searching Authority dated Feb. 24, 2022 in connection with International Patent Application No. PCT/US2021/059421, 16 pages.

International Search Report and Written Opinion of the International Searching Authority dated Apr. 8, 2022 in connection with International Patent Application No. PCT/US2021/064527, 10 pages.

Office Action dated Apr. 13, 2022 in connection with U.S. Appl. No. 17/174,132, 20 pages.

Blumenthal, "Silicon Nitride in Silicon Photonics," Proceedings of the IEEE, vol. 106, No. 12, Dec. 2018, 23 pages.

He et al., "Review of Photonic Integrated Optical Phased Arrays for Space Optical Communication," IEEE Access, vol. 3, Oct. 2020, 16 pages.

Notice of Allowance dated Aug. 17, 2022 in connection with U.S. Appl. No. 17/174,180, 10 pages.

Notice of Allowance dated Jun. 23, 2022 in connection with U.S. Appl. No. 17/174,132, 16 pages.

* cited by examiner

INTEGRATED PHOTONIC INTEGRATED CIRCUIT (PIC) AND READOUT INTEGRATED CIRCUIT (ROIC) FOR HIGH-SPEED DATA OUTPUT FROM FOCAL PLANE ARRAY

TECHNICAL FIELD

This disclosure relates generally to optical systems. More specifically, this disclosure relates to an integrated photonic integrated circuit (PIC) and readout integrated circuit (ROIC) for high-speed data output from a focal plane array.

BACKGROUND

A focal plane array (FPA) is an image sensing device used in many applications to capture incoming light and generate data representative of the incoming light. For example, a focal plane array may be used to capture an image using a planar pixel detector, which detects incoming light to support imaging. Current trends associated with focal plane arrays involve increasing the sizes of the focal plane arrays, increasing the framerates of the focal plane arrays, and increasing the bit depths of the focal plane arrays.

SUMMARY

This disclosure relates to an integrated photonic integrated circuit (PIC) and readout integrated circuit (ROIC) for high-speed data output from a focal plane array.

In a first embodiment, an apparatus includes a focal plane array configured to receive incoming light. The apparatus also includes a readout integrated circuit configured to generate electrical signals based on the incoming light received by the focal plane array. The apparatus further includes a photonic integrated circuit positioned between the focal plane array and the readout integrated circuit. The photonic integrated circuit is configured to receive the electrical signals and generate output optical signals based on the electrical signals.

In a second embodiment, an optical node includes an optical receiver or transceiver. The optical receiver or transceiver includes a focal plane array configured to receive incoming light. The optical receiver or transceiver also includes a readout integrated circuit configured to generate electrical signals based on the incoming light received by the focal plane array. The optical receiver or transceiver further includes a photonic integrated circuit positioned between the focal plane array and the readout integrated circuit. The photonic integrated circuit is configured to receive the electrical signals and generate output optical signals based on the electrical signals.

In a third embodiment, a method includes receiving incoming light at a focal plane array. The method also includes, using a readout integrated circuit, generating electrical signals based on the incoming light received by the focal plane array. The method further includes, using a photonic integrated circuit, generating output optical signals based on the electrical signals. The photonic integrated circuit is positioned between the focal plane array and the readout integrated circuit.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
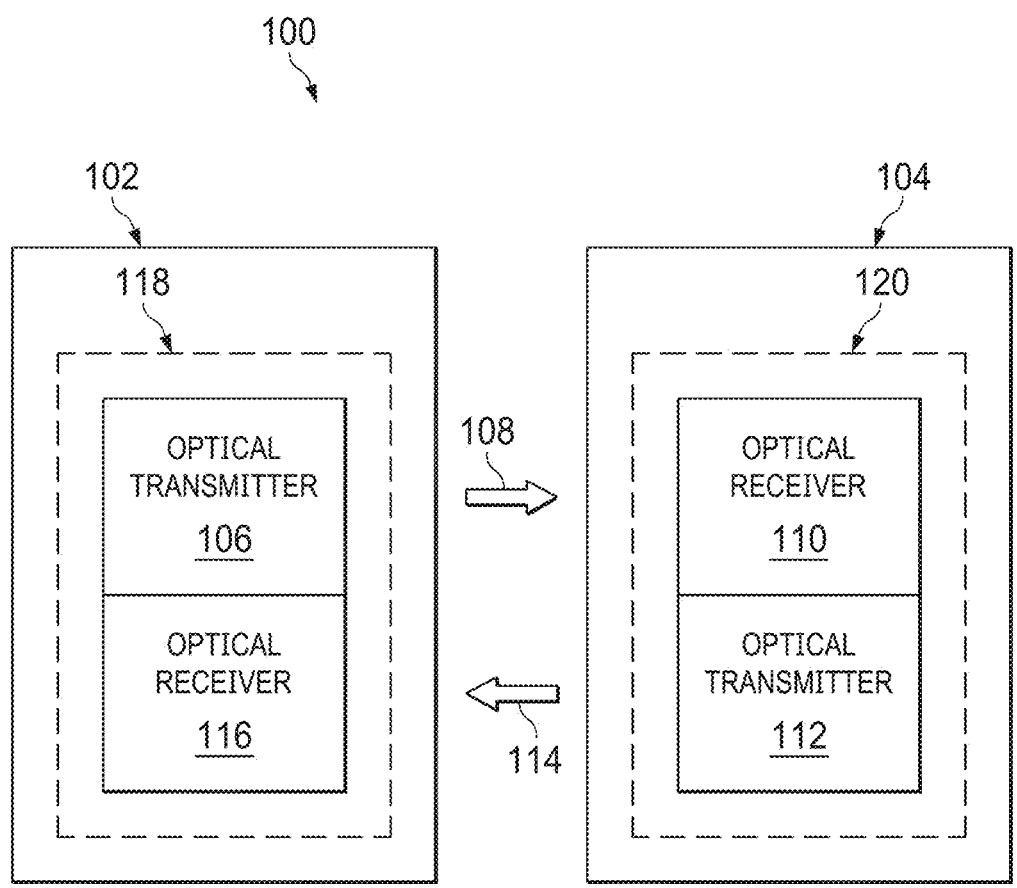
FIG. 1 illustrates an example system using high-speed data output from focal plane arrays according to this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, a focal plane array (FPA) is an image sensing device used in many applications to capture incoming light and generate data representative of the incoming light. For example, a focal plane array may be used to capture an image using a planar pixel detector, which detects incoming light to support imaging. Current trends associated with focal plane arrays involve increasing the sizes of the focal plane arrays, increasing the framerates of the focal plane arrays, and increasing the bit depths of the focal plane arrays.

Unfortunately, all of these factors increase the volume of data that the focal plane array needs to transmit to higher levels within the system, creating a bottleneck at this interface. Thus, these trends can create various issues in architectures using focal plane arrays. For example, these trends can increase the strain on data output architectures (since there are larger amounts of data generated using the focal plane arrays) and power architectures (since there are more components used in the focal plane arrays and data output architectures). Moreover, transmission distances for transporting data from the focal plane arrays can be limited due to the characteristics of high-speed copper transmission lines. While repeaters or other electronic devices may be used, adding repeaters or other electronic devices closer to sensors in focal plane arrays can add complexities and costs to various designs and can increase the power consumptions of the various designs. Some approaches have attempted to implement massively-parallel electrical outputs from focal plane arrays, but these approaches are overly complex and are difficult and expensive to manufacture.

This disclosure provides designs and techniques for integrating a photonic integrated circuit (PIC) and a readout integrated circuit (ROIC) for high-speed data output from a focal plane array. As described in more detail below, a photonic integrated circuit and a readout integrated circuit can be integrated with a focal plane array into a single monolithic structure, such as a semiconductor wafer. The readout integrated circuit outputs data based on light received by the focal plane array, and the photonic integrated circuit converts the data into optical signals for transmission. In some cases, the photonic integrated circuit can be physically positioned between the focal plane array and the readout integrated circuit, and electrical vias can pass through the photonic integrated circuit between the focal plane array and the readout integrated circuit.

In this way, data generated using a focal plane array can be output optically, and the optical outputs can have much higher data rates and be transported over much larger distances compared to the use of electrical output signals. Moreover, this can be achieved using reduced power consumptions, such as by reducing or minimizing electrical drive distances between drivers and modulators and by reducing or eliminating certain wirebonds or other electrical components (which can add inductances and noise). Further, the integration of components like photonic integrated circuits and readout integrated circuits can enable many additional functionalities to be included in the integrated structures, such as built-in self-tests, single-source optical pumping, and on-board optical processing. Features such as optical shielding may also be far more effective in these types of integrated architectures. In addition, the ability to integrate a photonic integrated circuit and a readout integrated circuit with a focal plane array can simplify routing of electrical and optical signals, increase reliability, and produce more compact packages.

FIG. 1 illustrates an example system 100 using high-speed data output from focal plane arrays according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same structure to be used for both transmission and reception purposes. Similarly, while the optical transmitter 112 and the optical receiver 110 are shown here as separate components, they can be integrated into a single optical transceiver 120. This may allow, for instance, the same structure to be used for both transmission and reception purposes.

As described in more detail below, each optical receiver 110 and 116 or each optical transceiver 118 and 120 may be implemented using at least one focal plane array that is used to receive the optical signals 108 and 114. Each focal plane array may be integrated with a readout integrated circuit, which can output data in the form of electrical signals based on light received by the focal plane array. Each focal plane array may also be integrated with a photonic integrated circuit, which can convert the electrical signals back into optical signals for transport to one or more destinations (such as an optical receiver). This helps to provide for faster data output from the integrated structure over longer distances, reduced power consumption, reduced packaging size, and other benefits or advantages as described above.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. As a particular example, optical transmitters, receivers, or transceivers may be used in optical 5G networks or other telecommunication networks that support optical communications. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with photonic integrated circuit (PIC)-based optical phased arrays. In general, this disclosure is not limited to any particular application of the optical transmitters, receivers, and transceivers.

Although FIG. 1 illustrates one example of a system 100 using high-speed data output from focal plane arrays, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2:
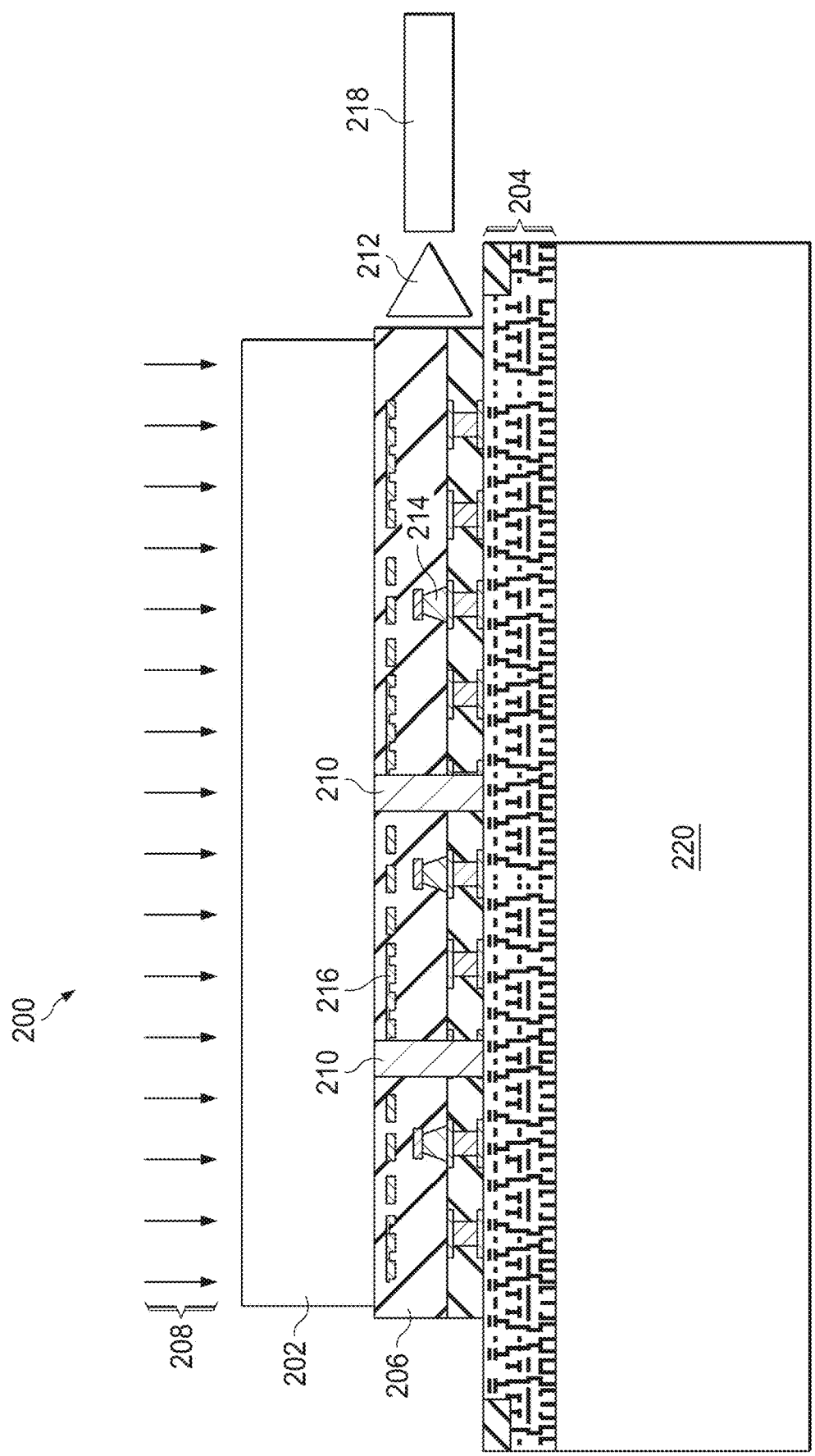
FIG. 2 illustrates an example optical device integrating a focal plane array, a readout integrated circuit, and a photonic integrated circuit according to this disclosure.

FIG. 2 illustrates an example optical device 200 integrating a focal plane array 202, a readout integrated circuit 204, and a photonic integrated circuit 206 according to this disclosure. For ease of explanation, the optical device 200 may be described as being used to implement each optical receiver 110 and 116 or at least part of each optical transceiver 118 and 120 in FIG. 1. However, the optical device 200 may be used in any other suitable device and in any other suitable system.

As shown in FIG. 2, the focal plane array 202 is positioned above the readout integrated circuit 204 and the photonic integrated circuit 206. The focal plane array 202 generally operates to receive and capture incoming light 208. For example, the focal plane array 202 may include photodetectors or other components that can capture optical energy and convert the optical energy into electrical energy in the form of photocurrents. The focal plane array 202 can be formed from any suitable material(s) and in any suitable manner. The focal plane array 202 can also have any suitable size, shape, and dimensions. Various designs for focal plane arrays are known in the art, and additional designs for focal plane arrays are sure to be developed in the future. In general, this disclosure is not limited to any particular design for the focal plane array 202.

The readout integrated circuit 204 is electrically coupled to the focal plane array 202. The photocurrents from the focal plane array 202 are provided to the readout integrated circuit 204, and the readout integrated circuit 204 can integrate and further process the photocurrents in order to generate electrical signals representative of the incoming light 208 captured by the focal plane array 202. The readout integrated circuit 204 may include any suitable components for generating electrical signals based on photocurrents from a focal plane array 202. For example, the readout integrated circuit 204 may include capacitors and other structures that can be used to integrate/accumulate the photocurrents from the focal plane array 202 and generate output electrical signals based on the integrated/accumulated photocurrents. Various designs for readout integrated circuits are known in the art, and additional designs for readout integrated circuits are sure to be developed in the future. In general, this disclosure is not limited to any particular design for the readout integrated circuit 204.

In this example, the readout integrated circuit 204 is electrically coupled to the focal plane array 202 using multiple electrically-conductive vias 210. The electrically-conductive vias 210 provide the photocurrents from the focal plane array 202 to the readout integrated circuit 204 for integration. The electrically-conductive vias 210 represent any suitable structures configured to pass electrical signals between layers of the optical device 200, such as copper-filled or other metal-filled vias. The number of electrically-conductive vias 210 and the arrangement of the electrically-conductive vias 210 can vary depending on the implementation, such as based on the number of cells in the focal plane array 202.

The photonic integrated circuit 206 receives the electrical signals generated by the readout integrated circuit 204 and converts the electrical signals into optical signals 212. For example, the photonic integrated circuit 206 may include various components used to modulate optical signals at one or more wavelengths based on the electrical signals provided by the readout integrated circuit 204. As a result, in some cases, the photonic integrated circuit 206 is able to generate a large number of optical signals representing a large number of electrical signals from the readout integrated circuit 204. This enables the photonic integrated circuit 206 to produce optical signals 212 representing the incoming light 208 captured by the focal plane array 202. The photonic integrated circuit 206 includes any suitable structure or structures configured to transmit optical signals based on electrical signals. In this example, the photonic integrated circuit 206 is shown as generally including modulators 214 that modulate optical signals and waveguides 216 that couple optical signals from an input source to the modulators 214 and to the output of the photonic integrated circuit 206. Various designs for photonic integrated circuits are known in the art, and additional designs for photonic integrated circuits are sure to be developed in the future. In general, this disclosure is not limited to any particular design of the photonic integrated circuit 206.

In the example of the optical device 200 shown in FIG. 2, the optical signals 212 from the photonic integrated circuit 206 are provided to at least one waveguide 218, which is used to transport the optical signals 212 to at least one external destination for use. The at least one waveguide 218 can represent any suitable structure or structures configured to transport optical signals, such as at least one fiber optic cable. The at least one waveguide 218 may be coupled to the photonic integrated circuit 206 in any suitable manner, such as through the use of edge coupling or photonic wirebonds.

In some embodiments, the focal plane array 202, readout integrated circuit 204, and photonic integrated circuit 206 form a monolithic structure. In some cases, all components of the optical device 200 may be fabricated using standard complementary metal oxide semiconductor (CMOS) fabrication techniques or other silicon-based processes. As a result, this type of approach can help to facilitate volume production of the optical device 200 and enable various additional functions or features to be implemented in one or more layers of the optical device 200 as needed or desired. In this example, the optical device 200 includes or is formed over a semiconductor substrate 220, which may represent a silicon substrate or other semiconductor substrate in or on which semiconductor components (such as components of the readout integrated circuit 204) can be formed.

Although FIG. 2 illustrates one example of an optical device 200 integrating a focal plane array 202, a readout integrated circuit 204, and a photonic integrated circuit 206, various changes may be made to FIG. 2. For example, the sizes of various components in FIG. 2 have been exaggerated for ease of illustration and explanation. Also, any suitable number of each of the components shown in FIG. 2 may be used in any particular implementation of the optical device 200.

Figure 3:
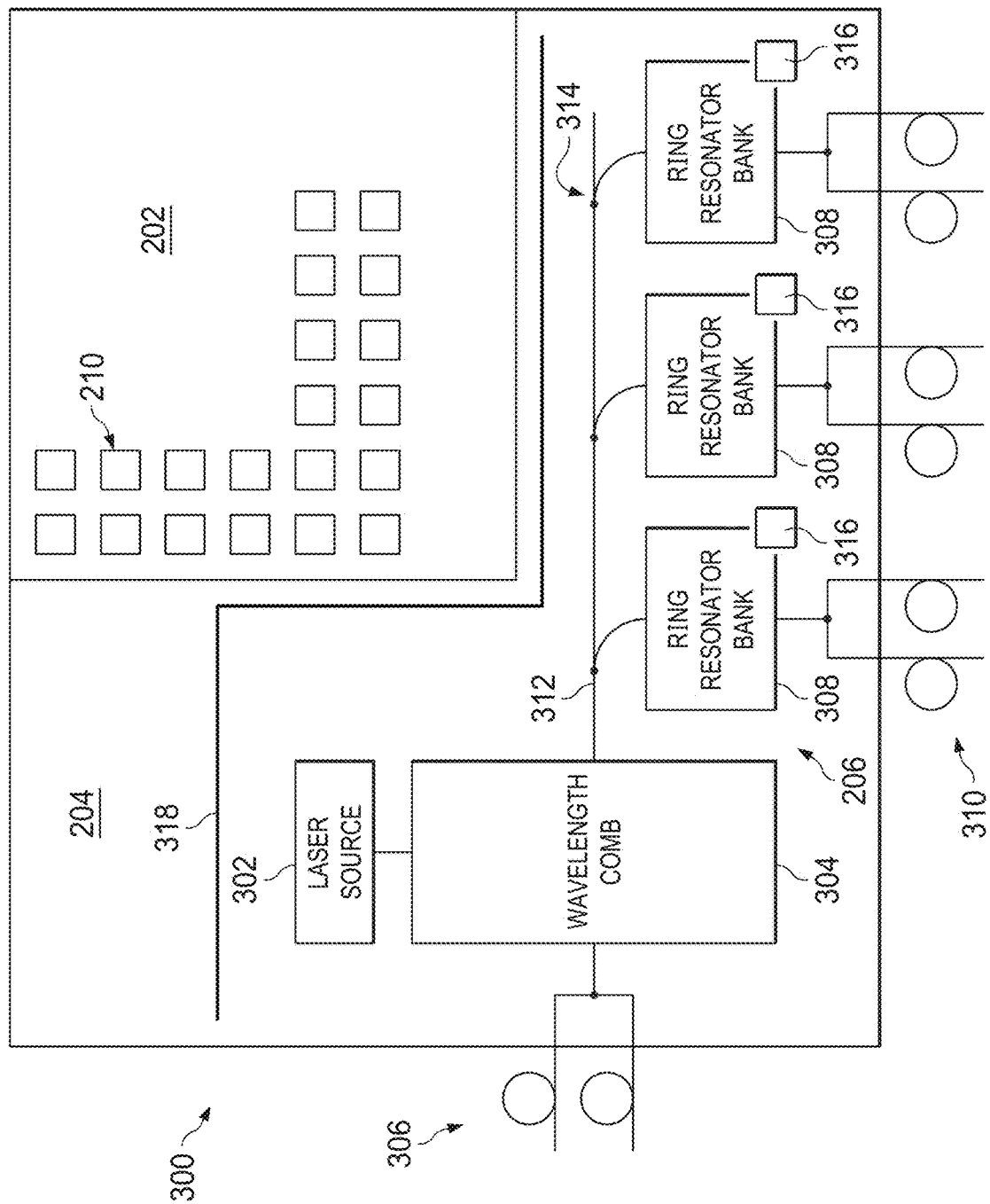
FIG. 3 illustrates an example layout of an optical device integrating a focal plane array, a readout integrated circuit, and a photonic integrated circuit and supporting additional functionalities according to this disclosure.

FIG. 3 illustrates an example layout 300 of an optical device 200 integrating a focal plane array 202, a readout integrated circuit 204, and a photonic integrated circuit 206 and supporting additional functionalities according to this disclosure. For ease of explanation, the layout 300 may be described as being used to implement the optical device 200 of FIG. 2, which may be used to implement each optical receiver 110 and 116 or at least part of each optical transceiver 118 and 120 in FIG. 1. However, the layout 300 may be used with any other suitable device and in any other suitable system.

As shown in FIG. 3, the focal plane array 202 is positioned over the readout integrated circuit 204 and can be electrically coupled to the readout integrated circuit 204 using multiple electrically-conductive vias 210. One or more layers implementing the photonic integrated circuit 206 are positioned between the focal plane array 202 and the readout integrated circuit 204. As a result, in this example, the electrically-conductive vias 210 can extend through the layer(s) implementing the photonic integrated circuit 206.

In some embodiments, one or more of the following features may be implemented within or otherwise included in the layout 300 of the optical device 200. A source laser 302 can be implemented within the photonic integrated circuit 206 or elsewhere within the monolithic optical device 200. The source laser 302 can be used to generate one or more optical signals used by the photonic integrated circuit 206. For example, in some cases, the source laser 302 can generate one or more optical signals that the photonic integrated circuit 206 uses to transmit outgoing optical signals. In other cases, the source laser 302 can generate one or more optical signals that are used during self-testing of the photonic integrated circuit 206. In still other cases, the source laser 302 can be used for both purposes. The source laser 302 represents any suitable on-chip laser source or other laser source that can be integrated into a monolithic optical device. In some cases, for instance, the source laser 302 may represent a III-V vertical-external-cavity surface-emitting-laser (VECSEL) or other III-V laser source, which is formed using one or more Group III elements and one or more Group V elements from the periodic table.

A wavelength comb 304 (also referred to as a frequency comb) can be used to generate multiple optical signals having different and equally-spaced wavelengths (or frequencies). For example, the wavelength comb 304 could receive an input optical signal (such as from the source laser 302 or an external source via one or more input optical fibers 306) and shift the wavelength or frequency of the input optical signal by a specified amount to generate a second optical signal, shift the wavelength or frequency of the second optical signal by the specified amount to generate a third optical signal, shift the wavelength or frequency of the third optical signal by the specified amount to generate a fourth optical signal, and so on. This may be repeated any number of times in order to produce any desired number of optical signals at different wavelengths or frequencies. The wavelength comb 304 includes any suitable structure or structures configured to generate optical signals having substantially equal wavelength or frequency spacing between adjacent optical signals. This type of on-chip comb generation can support various functions in the optical device 200, such as dense wavelength division multiplexing (DWDM).

In this example, the one or more input optical fibers 306 may be used to provide one or more incoming optical signals to the photonic integrated circuit 206. The one or more incoming optical signals may be used by the photonic integrated circuit 206 to generate and transmit outgoing optical signals that contain data provided by the readout integrated circuit 204. For example, the one or more incoming optical signals may include a single-wavelength optical signal used by the wavelength comb 304 to generate multiple optical signals having different and equally-spaced wavelengths or frequencies (which assumes that the source laser 302 is not present or is not used for this purpose). In this particular example, there are multiple input optical fibers 306, which may be used to provide the same incoming optical signal to the photonic integrated circuit 206 over multiple pathways (thereby providing some redundancy with the optical device 200). However, in other cases, the incoming optical signal may be provided to the photonic integrated circuit 206 using a single input optical fiber 306, or the input optical fibers 306 may be omitted if the source laser 302 can provide the desired incoming optical signal.

Figure 4:
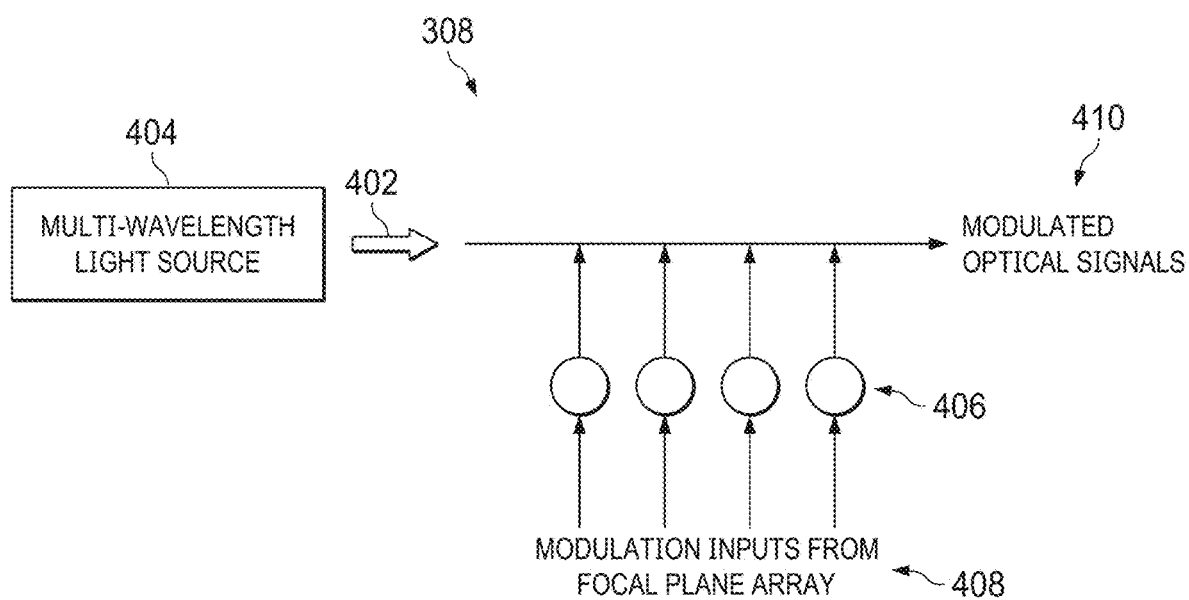
FIG. 4 illustrates an example ring resonator bank that may be used in an optical device integrating a focal plane array, a readout integrated circuit, and a photonic integrated circuit according to this disclosure.

The photonic integrated circuit 206 in this example can include multiple ring resonator banks 308, and each ring resonator bank 308 can be used to generate encoded optical signals. The encoded optical signals represent optical signals that have been modulated using electrical signals from the readout integrated circuit 204. FIG. 4 illustrates an example ring resonator bank 308 that may be used in an optical device 200 integrating a focal plane array 202, a readout integrated circuit 204, and a photonic integrated circuit 206 according to this disclosure. As shown in FIG. 4, the ring resonator bank 308 can receive a multi-wavelength input optical signal 402 from a multi-wavelength light source 404 (such as the wavelength comb 304). In some embodiments, the multi-wavelength light source 404 may represent an off-chip device or system, such as multiple laser sources or other sources configured to generate optical energies at different wavelengths/frequencies and a wavelength or frequency multiplexer configured to combine the optical energies and produce the multi-wavelength input optical signal 402. In other embodiments, the multi-wavelength light source 404 may represent an on-chip device, such as the wavelength comb 304.

Optical modulators 406 are used to modulate the optical energies of the multi-wavelength input optical signal 402 at the different wavelengths/frequencies. For example, an optical modulator 406 may be provided for each of the discrete wavelengths or frequencies supported by the wavelength comb 304 or other multi-wavelength light source 404 and included in the multi-wavelength input optical signal 402. The optical modulators 406 can be controlled based on modulation inputs 408 that are received from the focal plane array 202. In other words, the optical modulators 406 can be used to modulate data values from the focal plane array 202 (as provided by the readout integrated circuit 204) onto optical signals. This results in the creation of modulated optical signals 410, which encode the data values from the focal plane array 202. These components can be used to provide multiple tuned resonators for each optical channel supported by the photonic integrated circuit 206. Also, by using input optical signals from the wavelength comb 304 or other suitable multi-wavelength input optical signals, the ring resonator banks 308 can be configured to produce multiple narrowband modulated output optical signals.

Returning to FIG. 3, the modulated optical signals 410 from each ring resonator bank 308 can be output using one or more output optical fibers 310. In this particular example, there are multiple output optical fibers 310 for each ring resonator bank 308, which may be used to provide redundant copies of the modulated optical signals 410 over multiple pathways (again thereby providing some redundancy with the optical device 200). However, in other cases, the modulated optical signals 410 from each ring resonator bank 308 may be provided from the photonic integrated circuit 206 using a single output optical fiber 310.

In this example, waveguides 312 and splitters 314 can be used to route optical signals (such as the outputs of the wavelength comb 304 or optical signals received over the input optical fiber(s) 306) to the ring resonator banks 308. Each waveguide 312 includes any suitable structure or structures configured to transport optical signals, and each splitter 314 includes any suitable structure or structures configured to separate optical signals. In some embodiments, the splitters 314 may be designed so that each ring resonator bank 308 receives substantially the same amount of optical power. These components can be used in the optical device 200 to facilitate the generation of multiple optical output streams from the photonic integrated circuit 206.

One or more built-in self-test (BIST) units 316 can be provided in the optical device 200, such as one for each ring resonator bank 308. Each built-in self-test unit 316 can monitor one or more intermediate or output optical signals generated by the photonic integrated circuit 206 and compare the one or more optical signals to one or more expected optical signals. Thus, for example, each built-in self-test unit 316 may apply known data as the modulation inputs 408 to the optical modulators 406 in the associated ring resonator bank 308 and verify that correct modulated optical signals 410 are generated. This can help to verify the operation of various components in the optical device 200, such as the component(s) generating optical signals at one or more wavelengths and the component(s) modulating data onto the optical signals. In some instances, the built-in self-test units 316 can implement stabilization feedback loops that measure outputs of the photonic integrated circuit 206 and, if necessary, adjust components of the photonic integrated circuit 206 used to transmit optical signals.

In addition, optical shielding 318 may be positioned above and below or otherwise in association with the focal plane array 202. The optical shielding 318 can be used to help provide protection to the focal plane array 202 or to help ensure that the focal plane array 202 is receiving and measuring desired incoming light 208. For example, in some cases, the focal plane array 202 may be used to measure infrared energy, and the optical shielding 318 may be used to limit the incoming light 208 received by the focal plane array 202 to the infrared energy provided from a scene being imaged. The optical shielding 318 may be formed from any suitable material(s) and in any suitable manner. The optical shielding 318 may also have any suitable size, shape, and dimensions. In general, this disclosure is not limited to any particular type or arrangement for the optical shielding 318.

Although FIG. 3 illustrates one example of a layout 300 of an optical device 200 integrating a focal plane array 202, a readout integrated circuit 204, and a photonic integrated circuit 206 and supporting additional functionalities, various changes may be made to FIG. 3. For example, the actual physical layout of the various components of the optical device 200 may vary in any number of ways depending on the specific implementation. Also, the various components supporting the additional functionalities described above may be used individually or in any desired combination depending on the implementation. Although FIG. 4 illustrates one example of a ring resonator bank 308 that may be used in an optical device 200 integrating a focal plane array 202, a readout integrated circuit 204, and a photonic integrated circuit 206, various changes may be made to FIG. 4. For instance, while four optical modulators 406 are shown here, less than four or more than four optical modulators 406 may be used. Also, other approaches for modulating optical signals using data from a readout integrated circuit 204 may be used in the optical device 200.

The following describes example embodiments of this disclosure that implement or relate to an integrated photonic integrated circuit and readout integrated circuit for high-speed data output from a focal plane array. However, other embodiments may be used in accordance with the teachings of this disclosure.

In a first embodiment, an apparatus includes a focal plane array configured to receive incoming light. The apparatus also includes a readout integrated circuit configured to generate electrical signals based on the incoming light received by the focal plane array. The apparatus further includes a photonic integrated circuit positioned between the focal plane array and the readout integrated circuit. The photonic integrated circuit is configured to receive the electrical signals and generate output optical signals based on the electrical signals.

In a second embodiment, an optical node includes an optical receiver or transceiver. The optical receiver or transceiver includes a focal plane array configured to receive incoming light. The optical receiver or transceiver also includes a readout integrated circuit configured to generate electrical signals based on the incoming light received by the focal plane array. The optical receiver or transceiver further includes a photonic integrated circuit positioned between the focal plane array and the readout integrated circuit. The photonic integrated circuit is configured to receive the electrical signals and generate output optical signals based on the electrical signals.

In a third embodiment, a method includes receiving incoming light at a focal plane array. The method also includes, using a readout integrated circuit, generating electrical signals based on the incoming light received by the focal plane array. The method further includes, using a photonic integrated circuit, generating output optical signals based on the electrical signals. The photonic integrated circuit is positioned between the focal plane array and the readout integrated circuit.

Any single one or any suitable combination of the following features may be used with the first, second, or third embodiment. Electrically-conductive vias may electrically couple the focal plane array and the readout integrated circuit, and at least some of the electrically-conductive vias may extend through the photonic integrated circuit. The photonic integrated circuit may be configured to transmit the output optical signals through at least one waveguide. The focal plane array, the readout integrated circuit, and the photonic integrated circuit may form at least part of a monolithic structure. A source laser may be configured to generate an optical signal used by the photonic integrated circuit, and the source laser may be integrated into the monolithic structure. A wavelength comb may be configured to generate multiple optical signals used by the photonic integrated circuit, the multiple optical signals may have a wavelength spacing, and the wavelength comb may be integrated into the monolithic structure. Each of multiple resonator banks may be configured to modulate multiple optical signals based on the electrical signals, and the resonator banks may be integrated into the monolithic structure. At least one built-in self-test unit may be configured to test operation of the photonic integrated circuit, and the at least one built-in self-test unit may be integrated into the monolithic structure. At least one optical shielding may be associated with the focal plane array, and the at least one optical shielding may be integrated into the monolithic structure.

In some embodiments, various functions described in this patent document are implemented or supported (commanded and controlled, for example) by a computer program or custom electronics with firmware that is formed from computer readable program code and that is embodied in a computer readable medium. The phrase "computer readable program code" includes any type of computer code, including source code, object code, executable code, and hardware-defined execution such as in a field programmable gate array (FPGA) or other custom integrated circuit. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a focal plane array including at least one photodetector configured to receive incoming optical energy and convert the incoming optical energy into photocurrents;
   a readout integrated circuit including integrating circuitry configured to integrate the photocurrents from the focal plane array and generate electrical signals responsive to the photocurrents; and
   a photonic integrated circuit including conversion circuitry configured to receive the electrical signals from the readout integrated circuit and convert the electrical signals into output optical signals representing the incoming optical energy received by the focal plane array.

2. The apparatus of claim 1, further comprising:
   electrically-conductive vias electrically coupling the focal plane array and the readout integrated circuit, at least some of the electrically-conductive vias extending through the photonic integrated circuit.

3. The apparatus of claim 1, wherein the photonic integrated circuit is configured to transmit the output optical signals through at least one waveguide external to the apparatus.

4. The apparatus of claim 1, wherein the focal plane array, the readout integrated circuit, and the photonic integrated circuit form at least part of a monolithic structure.

5. The apparatus of claim 4, further comprising:
   a source laser configured to generate an optical signal used by the photonic integrated circuit, the source laser integrated into the monolithic structure.

6. The apparatus of claim 4, further comprising:
   a wavelength comb generator configured to generate multiple optical signals used by the photonic integrated circuit, the multiple optical signals having a wavelength spacing, the wavelength comb generator integrated into the monolithic structure.

7. The apparatus of claim 4, further comprising:
   multiple resonator banks, each resonator bank configured to modulate multiple optical signals based on the electrical signals, the resonator banks integrated into the monolithic structure.

8. The apparatus of claim 4, further comprising:
   at least one built-in self-test implemented within at least one of the readout integrated circuit or the photonic integrated circuit and configured to test operation of the photonic integrated circuit, the at least one built-in self-test integrated into the monolithic structure.

9. The apparatus of claim 4, further comprising:
   at least one optical shielding associated with the focal plane array, the at least one optical shielding integrated into the monolithic structure.

10. An optical node comprising:
    an optical receiver or transceiver comprising:
      a focal plane array including at least one photodetector configured to receive incoming optical energy and convert the incoming optical energy into photocurrents;
      a readout integrated circuit including integrating circuitry configured to integrate the photocurrents from the focal plane array and generate electrical signals responsive to the photocurrents; and
      a photonic integrated circuit including conversion circuitry configured to receive the electrical signals from the readout integrated circuit and convert the electrical signals into output optical signals representing the incoming optical energy received by the focal plane array.

11. The optical node of claim 10, wherein the optical receiver or transceiver further comprises electrically-conductive vias electrically coupling the focal plane array and the readout integrated circuit, at least some of the electrically-conductive vias extending through the photonic integrated circuit.

12. The optical node of claim 10, wherein the focal plane array, the readout integrated circuit, and the photonic integrated circuit form at least part of a monolithic structure.

13. The optical node of claim 12, wherein the photonic integrated circuit is configured to transmit the output optical signals through at least one waveguide external to the monolithic structure.

14. The optical node of claim 12, wherein the optical receiver or transceiver further comprises a source laser configured to generate an optical signal used by the photonic integrated circuit, the source laser integrated into the monolithic structure.

15. The optical node of claim 12, wherein the optical receiver or transceiver further comprises a wavelength comb generator configured to generate multiple optical signals used by the photonic integrated circuit, the multiple optical signals having a wavelength spacing, the wavelength comb generator integrated into the monolithic structure.

16. The optical node of claim 12, wherein the optical receiver or transceiver further comprises multiple resonator banks, each resonator bank configured to modulate multiple optical signals based on the electrical signals, the resonator banks integrated into the monolithic structure.

17. The optical node of claim 12, wherein the optical receiver or transceiver further comprises at least one built-in self-test implemented within at least one of the readout integrated circuit or the photonic integrated circuit and configured to test operation of the photonic integrated circuit, the at least one built-in self-test integrated into the monolithic structure.

18. The optical node of claim 12, wherein the optical receiver or transceiver further comprises at least one optical shielding associated with the focal plane array, the at least one optical shielding integrated into the monolithic structure.

19. A method comprising:
  receiving incoming optical energy at a focal plane array including at least one photodetector;
  converting the incoming optical energy into photocurrents at the focal plane array using the at least one photodetector;
  using a readout integrated circuit including integrating circuitry, integrating the photocurrents from the focal plane array;
  using the readout integrated circuit, generating electrical signals responsive to the integrated photocurrents; and
  using a photonic integrated circuit including conversion circuitry, converting the electrical signals into output optical signals representing the incoming optical energy received by the focal plane array.

20. The method of claim 19, wherein electrically-conductive vias electrically couple the focal plane array and the readout integrated circuit, at least some of the electrically-conductive vias extending through the photonic integrated circuit.

* * * * *